United States Patent Office 2,882,124
Patented Apr. 14, 1959

2,882,124

SOLVENT EXTRACTION PROCESS FOR PLUTONIUM

Glenn T. Seaborg, Chicago, Ill., assignor to the United States of America as represented by the United States Atomic Energy Commission No Drawing. Application October 12, 1945
Serial No. 622,097

14 Claims. (Cl. 23—14.5)

The present invention relates to the solvent extraction of heavy metal compounds, and particularly to the extraction of a compound of a transuranic element from an aqueous solution thereof by means of an organic solvent.

An object of this invention is to provide a method for the separation of a transuranic element from aqueous solutions thereof.

Another object of this invention is to provide a method for the separation and purification of a transuranic element contained in aqueous solutions of said element and other elements of lower atomic weights.

A further object of the present invention is to provide suitable organic solvents and extraction procedures for the separation of element 94 from aqueous solutions thereof.

Other objects and advantages of this invention will be evident from the following description.

The term "element 94" is used in this specification to designate the element of atomic number 94, which is also referred to herein as plutonium, symbol Pu. It has recently become known that various isotopes of element 94 can be prepared by a number of different nuclear processes. Thus, the plutonium isotope of mass 238, referred to as $94^{238}$, can be prepared by deuteron bombardment of the uranium isotope $92^{238}$ to produce $93^{238}$, followed by beta decay of the $92^{238}$ to $94^{238}$. (The isotope $93^{238}$ is the mass 238 isotope of the element of atomic number 93, referred to as neptunium, symbol Np.) The plutonium isotopes $94^{239}$ and $94^{240}$ can be prepared by neutron bombardment of the uranium isotope of mass 238:

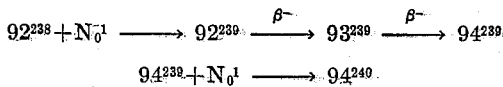

Neutronic reactors for the production of element 94 from natural uranium by a self sustaining chain reaction have recently been developed. One of the isotopes occurring in natural uranium is $92^{235}$, which is usually present to the extent of about 0.71 percent by weight. When this isotope is bombarded by slow neutrons, preferably of thermal energies, it undergoes fission and releases on an average of about two neutrons per neutron. In addition to fission fragments of relatively low atomic weights. The isotopes $94^{239}$ and $94^{240}$ can also undergo fission when bombarded by neutrons, and these fission processes also release an average of about two neutrons per neutron absorbed in the fission reaction. Thus, in a natural-uranium neutronic reactor, the excess neutrons released by fission are sufficient to maintain production of element 94 through neutron absorption by the predominant uranium isotope $92^{238}$. The concentration of plutonium so produced is generally small, rarely being above one percent by weight of the uranium and usually being substantially below such concentration.

Element 94 may suitably be separated from masses of uranium which have undergone neutron bombardment for periods of time sufficient to produce recoverable amounts of plutonium, but which may be insufficient to destroy more than a minute fraction of the total uranium through fission of $92^{235}$ and neutron absorption by $92^{238}$. It may be desired to recover the plutonium content of such uranium masses having plutonium concentrations below 1 part per thousand and even below 1 part per million parts of uranium.

Neutron-bombarded uranium, or a neutron-bombarded uranium compound, will contain, in addition to plutonium and unreacted uranium, various radioactive fission products in a total concentration of the same order of magnitude as the plutonium concentration. The original fragments produced by fission are highly unstable radioactive isotopes of short half-lives which rapidly decay to longer lived isotopes. The fission products which are present after practicable aging periods will usually range in atomic numbers from about 32 to about 64 and in atomic masses from about 77 to about 158. These fission products comprise largely a light group in which isotopes of Sr, Y, Zr, Cb, and Ru are the most dangerously radioactive; and a heavy group in which isotopes of Te, I, Cs, Ba, La, Ce, and Pr are the most dangerously radioactive.

In the recovery of plutonium from neutron-bombarded uranium, the plutonium is conveniently processed in aqueous solutions, and preferably in aqueous inorganic acid solutions. Thus, in the initial separation of plutonium from the bulk of the unreacted uranium and fission products, in the further decontamination of the plutonium by separation from residual radioactive fission products, and in the final concentration, purification, and recovery of plutonium, it is desirable to effect the plutonium separations from aqueous nitric acid or other suitable aqueous medium. Various precipitation methods have been suggested for the separation of plutonium from such aqueous solutions. These methods, however, have generally entailed the use of large amounts of auxiliary carrier precipitates, and the handling of very large volumes of solutions.

In accordance with the present invention, plutonium compounds may be separated from aqueous nitric acid solutions, aqueous hydrochloric acid solutions, or other suitable aqueous media, by extraction into organic solvents of the class hereinafter described. This solvent extraction procedure may be employed for the separation of plutonium from aqueous solutions in any phase of the above-mentioned procedure for the recovery of plutonium from neutron-irradiated uranium. In addition, the solvent extraction procedure of this invention may be used for the separation of plutonium compounds from aqueous solutions other than those derived directly from neutron-irradiated uranium. Such solutions may range from waste liquors containing only traces of plutonium to relatively concentrated solutions of pure plutonium compounds.

The aqueous solutions from which plutonium may be extracted in accordance with the present invention suitably contain plutonium ions of at least +4 valence state, said ions being substantially free from strong complexing agents. Preferably, no ion should be present in the aqueous solution which forms ionic complexes with plutonium more strongly than does the nitrate ion. The hydroxyl ion, and the anions of acids which ionize in aqueous solutions to a substantially smaller degree than nitric acid, are particularly disadvantageous from the standpoint of complexing tetravalent plutonium. Thus, hydroxyl, sulfate, phosphate, fluoride, and oxalate ions tend to complex tetravalent plutonium sufficiently to decrease its extractability into organic solvents. It is therefore desirable to minimize the concentrations of free ions of this class in the aqueous solutions to be extracted. Most of the complexing ions can be excluded in the preparation of the aqueous solutions. Alternatively, an interfering ion may itself be complexed by another ion, or its concentration as a free ion may otherwise be minimized by control of the concentration of another ion which can combine with it. Thus, the fluoride ion can be complexed by zirconyl ion, and the hydroxyl ion can be supressed by hydrogen ion, to reduce their interference with the extraction of tetravalent plutonium.

The extraction of hexavalent plutonium is relatively free from interference by hydroxyl ion. Hexavalent plutonium can be extracted from aqueous solutions of any hydrogen ion concentration sufficient to prevent the precipitation of a basic plutonium compound. An aqueous solution of plutonyl nitrate may thus be extracted without the necessity of free nitric acid in the solution. In the case of tetravalent plutonium, on the other hand, it is desirable to maintain free acid in the aqueous solution. Solutions of plutonous nitrate for extraction with organic solvents should have a pH not substantially above 2.5, and preferably should have a concentration of free nitric acid of at least 1 N.

In order to improve the distribution of plutonium between the aqueous and organic phases, it is generally desirable to incorporate a salting-out agent in the aqueous solution. A salting-out agent, for this purpose, has the same characteristics as a salting-out agent for previously known solvent extraction processes, i.e., high solubility in the solution to be extracted and low solubility in the extract phase. Likewise, it will be apparent that the presence of high concentrations of any substances which tend to dissolve in the solvent phase more readily than the plutonium, is to be avoided. If such a condition is permitted to occur a "salting back" of any plutonium present in the solvent layer takes place, thus tending to greatly decrease the efficiency of this process. The preferred salting-out agents for use in the present invention are those having a common ion with respect to the compound being extracted. Thus, if a nitrate of plutonium is being extracted, the salting out agent is preferably an inorganic nitrate. Examples of suitable salting-out agents for this purpose are:

$NaNO_3$     $Ca(NO_3)_2$
$KNO_3$     $Sr(NO_3)_2$
$LiNO_3$     $Mg(NO_3)_2$
$NH_4NO_3$     $La(NO_3)_3$
$Mn(NO_3)_2$     $Al(NO_3)_3$

The concentration of the salting-out agent which is desirable in any particular case will depend on the valence of the cation and the concentration of the common anion due to any free acid in the solution. In the case of 1 N nitric acid solutions, it is desirable to employ a concentration of a univalent nitrate of at least 3 M, and preferably 5–10 M. Equivalent concentrations of polyvalent nitrates may be employed at the same acid concentration, and the salt concentration may suitably be increased or decreased with decrease or increase in acid concentration.

The extraction agents which are suitable for use in my process comprise normally liquid organic solvents which are substantially immiscible with the aqueous solution to be extracted and which contain at least 1 atom capable of donating an electron pair to a coordination bond. Such solvents suitably comprise water-immiscible organic compounds containing an oxygen, sulphur, or nitrogen electron-donor atom. It will be evident, however, that most nitrogen-containing organic compounds of this type are basic in nature and will be unsuitable for the extraction of acidic aqueous solutions. Such compounds may be used, if desired, to extract substantially neutral solutions containing small amounts of hexavalent plutonium. Most organic solvents containing oxygen or sulphur donor atoms may be used for the extraction of acidic aqueous solutions as well as neutral solutions, and the oxygenated organic solvents are the preferred extractants for use in the present process.

Although most normally liquid organic compounds containing an atom with excess electrons, such as oxygen, sulphur, or nitrogen, are capable of forming a coordination bond, it will be evident to those skilled in the art that certain molecular structures can interfere with this electron-donating property. Electron-attracting constituents such as halogen atoms can off-set the electron-donating property of an atom such as oxygen, if present in sufficient number and proper relationship to the donor atom. For this reason it is preferable to employ compounds containing only carbon, hydrogen, and electron-donor atoms. It will also be apparent that certain molecular configurations can give rise to steric hindrance which may interfere sufficiently to prevent the formation of coordination bonds. Tertiary carbon atoms adjacent an electron-donor atom and long chains of non-donor atoms linked to a donor atom are especially undesirable in this respect. The preferred solvents are those in which the donor atom is linked to a hydrogen atom or to non-tertiary carbon atoms and in which at least one component linked to the donor atom contains less than four consecutive non-donor atoms.

The following are examples of suitable solvents for use in the present process:

| | |
|---|---|
| Ethyl ether | Heptadecanol |
| Bis-β-chloroethyl ether | 2-ethylbutanol |
| 2-phenoxyethanol | Methylisobutylcarbinol |
| 2-benzyloxyethanol | Methyl ethyl ketone |
| 2-(β-ethylbutoxy)ethanol | Methyl amyl ketone |
| 1,2-diethoxyethane | Methyl isobutyl ketone |
| 1-ethoxy-2-butoxyethane | Mesityl oxide |
| 1,2-dibutoxyethane | Acetophenone |
| Bis-β-butoxyethyl ether | Cyclopentanone |
| 1,2-bis-(β-chloroethoxy) ethane | Cyclohexanone |
| | 4-methylcyclohexanone |
| 5,8,11,14,17-pentoxaheneicosane | Menthone |
| o-Nitroanisole | Isophorone |
| 2,6-dimethyl-1,4-dioxane | Nitromethane |
| 1-oxa-2,5-dimethylcyclopentane | Nitroethane |
| | 1-nitropropane |
| Ethyl sulfide | Nitrobenzene |
| Hexanol | Tributyl phosphate |
| Heptanol | |

In employing any of the solvents of the above class in the present process, previously known extraction procedures and apparatus may be employed. The extraction may be effected by batch, continuous batch, batch counter-current, or continuous counter-current methods. The most efficient extraction is obtained in continuous counter-curent operation. The usual types of extraction equipment and the usual operating procedures may be employed when effecting the present extraction in this manner. Satisfactory extraction in accordance with this procedure may be obtained by the use of a packed column with aqueous feed at an intermediate point, solvent feed at the bottom of the column, and solvent draw-off at the top of the column. The top section of such a column may serve as a stripping section, and an auxiliary stripping medium may optionally be charged to the top of the column.

The plutonium may be recovered from the solvent extract phase by any suitable procedure such as evaporation of the solvent, crystallization with an isomorphous crystalline carrier, re-extraction with another immiscible solvent, or adsorption on a solid adsorbent.

It is apparent that the procedures described above may be applied to the extraction of plutonium from solutions containing various impurities of lower atomic weight which are insoluble in the organic solvent employed. The purification effected by this procedure is especially advantageous in separating plutonium from the fission products contained in solutions derived from neutron-irradiated uranium. This procedure is also useful in simultaneously extracting both plutonium and uranium from solutions of neutron-bombarded uranium. Repeated extractions with one or more solvents may be used to effect purification and concentration of plutonium to an extent sufficient to enable final recovery of a pure compound of plutonium.

The present invention will be further illustrated with particular reference to certain preferred classes of solvents.

One preferred class of solvents for use in the present invention comprises ethers containing at least one oxygen atom capable of donating an electron pair to a coordination bond. The most desirable compounds of this class are the saturated aliphatic ethers, and it has been found preferable to employ a dialkyl ether containing at least one oxygen atom which is attached by an ether linkage to non-tertiary aliphatic carbon atoms, at least one component linked to said oxygen atom containing less than four consecutive non-donor atoms. The following examples illustrate the use of solvents of this class:

Example 1

A solution of $PuO_2^{+2}$ in 1 M $HNO_3$–5 M $Ca(NO_3)_2$ was agitated with an equal volume of ethyl ether until extraction equilibrium was obtained. The phases were then separated and the extract was analyzed for plutonium content on the basis of its alpha radiation and that of the original aqueous solution. The plutonium content of the extract was found to be 94 percent of that in the initial charge.

Example 2

A solution of $PuO_2^{+2}$ in 1 M $HNO_3$–10 M $NH_4NO_3$ was charged into an extraction column and continuously extracted with approximately 5.4 times its volume of ethyl ether. At the conclusion of the extraction, the extract and raffinate were analyzed for plutonium content on the basis of the alpha radiation of the initial charge and of the resulting solutions. The plutonium distribution was found to be as follows:

| | Percent |
|---|---|
| Extract | 91.2 |
| Raffinate | 8.3 |
| Loss | 0.5 |

Example 3

Uranyl nitrate hexahydrate, which had been subjected to neutron irradiation from 50 milliampere hours' deuteron bombardment of beryllium and aged for 80 days, was melted, acidified with 70 percent nitric acid to 0.66 M $HNO_3$, made 0.02 M in $K_2Cr_2O_7$ with solid potassium dichromate, and held at 60° C. for about one hour to effect oxidation of the plutonium to $PuO_2^{+2}$. The solution was then cooled to room temperature and extracted with approximately 5.3 times its volume of ethyl ether, in a single stage batch extraction. The extract was found to contain 86 percent of the plutonium content of the aqueous charge, together with a substantially greater percentage of the uranium content of the charge, but only 8 percent of the fission products.

Example 4

A solution of $Pu^{+4}$ in 1 M $HNO_3$–10 M $NH_4NO_3$ was agitated with an equal volume of ethyl ether until the extraction equilibrium was attained. The phases were then separated and the extract was analyzed for plutonium content on the basis of its alpha radiation and that of the original aqueous solution. The plutonium content of the extract was found to be 35 percent of that in the initial charge.

The substitution of normal propyl or isopropyl ethers for the ethyl ether in the above examples will result in less advantageous distribution coefficients, but adequate extraction is obtainable in efficient counter-current operation.

The sulphur analogues of the ethers are also useful in my process, and the following example illustrates the use of a solvent of this type:

Example 5

A solution of $PuO_2^{+2}$ in 1 M $HNO_3$–10 M $NH_4NO_3$ was agitated with an equal volume of ethyl sulfide until the extraction equilibrium was attained. The phases were then separated and the extract was analyzed for plutonium content on the basis of its alpha radiation and that of the original aqueous solution. The plutonium content of the extract was found to be 43 percent of that in the initial charge.

The glycol ethers comprise a preferred class of solvents having especially favorable distribution coefficients for plutonium extraction. The desirable solvents of this class are saturated glycol ethers containing at least one oxygen atom which is attached by an ether linkage to a non tertiary aliphatic carbon atom, at least one component linked to said oxygen atom containing less than four consecutive non-donor atoms. The preferred ethers of this class are the monoglycol monoalkyl ethers, polyglycol monoalkyl ethers, monoglycol dialkyl ethers, and polyglycol dialkyl ethers. The following are examples of the use of solvents of this class:

Example 6

A solution of $PuO_2^{+2}$ in 1 M $HNO_3$–10 M $NH_4NO_3$ was agitated with an equal volume of 1,2-diethoxyethane until extraction equilibrium was attained. The phases were then separated and the extract was analyzed for plutonium content on the basis of its alpha radiation and that of the original aqueous solution. The plutonium content of the extract was found to be 96 percent of that in the initial charge.

Example 7

A solution of $Pu^{+4}$ in 1 M $HNO_3$–10 M $NH_4NO_3$ was charged into an extraction column and continuously extracted with approximately 6 times its volume of 2($\beta$-ethylbutoxy)ethanol. At the conclusion of the extraction, the extract and raffinate were analyzed for plutonium content. The plutonium distribution was found to be as follows:

| | Percent |
|---|---|
| Extract | 83.6 |
| Raffinate | 14.4 |
| Loss | 2.0 |

Example 8

A solution of $Pu^{+4}$ in 0.6 M $UO_2(NO_3)_2$–1 M $HNO_3$–10 M $NH_4NO_3$ was agitated with an equal volume of 2($\beta$-ethylbutoxy) ethanol until the extraction equilibrium was attained. The phases were then separated and the distribution of plutonium and uranium between the aqueous and organic phases was determined. The percentage extraction of each of the metals from the initial aqueous solution was found to be approximately as follows:

| | Percent |
|---|---|
| Plutonium | 60 |
| Uranium | 63 |

Example 9

A solution of $Pu^{+4}$ in 1 M $HNO_3$–10 M $NH_4NO_3$ was agitated with an equal volume of 2-benzyloxyethanol. After extraction equilibrium had been attained, the phases were separated and the extract was analyzed for plutonium content. It was found that the extraction was approximately 48 percent complete.

Another preferred class of solvents for use in the present extraction process comprises normally liquid organic solvents containing at least one carbonyl oxygen atom capable of donating an electron pair to a coordination bond. This class includes carbocyclic acids, esters, aldehydes and ketones. The most desirable solvents of this group comprise aliphatic ketones and especially dialkyl ketones having a carbonyl group attached to at least 1 non-tertiary carbon atom. The following are examples of the utilization of solvents of this class in the present process.

Example 10

A solution of $Pu^{+4}$ in 1 M $HNO_3$–10 M $NH_4NO_3$ was agitated with an equal volume of methyl ethyl ketone until the extraction equilibrium was attained. The phases were then separated and the extract was analyzed for plutonium content on the basis of its alpha radiation and that of the original aqueous solution. The plutonium content of the extract was found to be 78.9 percent of that in the initial charge.

Example 11

A solution of $PuO_2^{+2}$ in water substantially saturated with lithium nitrate was agitated with an equal volume of organic solvent comprising 90% methyl ethyl ketone and 10 percent mixed xylenes. After extraction equilibrium had been attained, the phases were separated and the extract was analyzed for plutonium content. It was found that the extraction was approximately 83 percent complete.

Example 12

A solution of $Pu^{+4}$ in 8 M HCl was agitated with an equal volume of methyl isobutyl ketone. After extraction equilibrium had been attained, the extract was analyzed for plutonium content. The extraction was found to be 91 percent complete.

Example 13

A lanthanum fluoride precipitate containing plutonous fluoride ($Pu^{+4}$) was dissolved in aqueous zirconyl nitrate and the resulting solution was made 3 M with respect to nitric acid and 5 M with respect to ammonium nitrate. The concentrations of zirconium, lanthanum, and plutonium in this solution were approximately 18.6, 6.2 and 0.0001 g. per liter, respectively.

The above solution was charged continuously to a packed extraction column at a point approximately 0.4 of the column length below the top of the column. Methyl isobutyl ketone was charged continuously to the bottom of the column at a rate approximately double the charge rate of the plutonium solution, and an aqueous stripping solution, comprising 3 M $HNO_3$–5 M $NH_4NO_3$, was continuously charged to the top of the column at a rate approximately one-half the charge rate of the plutonium solution. The total charge to the column, per hour, was approximately 0.9 of the column hold-up.

After reaching equilibrium, the methyl isobutyl ketone extract, which was continuously withdrawn from the top of the column, and the spent aqueous solution, which was continuously withdrawn from the bottom of the column, were analyzed for plutonium content. The extract was found to contain approximately 99.75 percent of the plutonium in the charge solution, and the spent aqueous solution contained the residual 0.25 percent.

Example 14

A solution of $Pu^{+4}$ in 1 M $HNO_3$–10 M $NH_4NO_3$ was agitated with an equal volume of acetophenone until the extraction equilibrium was attained. The phases were then separated and the extract was analyzed for plutonium content on the basis of its alpha radiation and that of the original aqueous solution. The plutonium content of the extract was found to be 89 percent of that in the original charge.

Example 15

A solution of $PuO_2^{+2}$ in 1 M $HNO_3$–10 M $NH_4NO_3$ was agitated with an equal volume of menthone until the extraction equilibrium was attained. The phases were then separated and the extract was analyzed for plutonium content. The extraction was found to be approximately 47 percent complete.

A further class of preferred solvents for the present invention comprises normally liquid organic solvents containing at least one nitro oxygen atom capable of donating an electron pair to a coordination bond. Desirable solvents of this class comprise nitrohydrocarbons and especially nitroalkanes. The following are examples of the use of nitrohydrocarbons in the present process:

Example 16

A solution of $Pu^{+4}$ in 1 M $HNO_3$–10 M $NH_4NO_3$ was agitated with an equal volume of nitromethane until the extraction equilibrium was attained. The phases were then separated and the extract was analyzed for plutonium content. The extraction was found to be approximately 58 percent complete.

Example 17

A solution of $PuO_2^{+2}$ in saturated aqueous lithium nitrate was agitated with 1.5 times its volume of nitromethane until the extraction equilibrium was attained. The phases were then separated, and the extract was found to contain approximately 80 percent of the plutonium content of the original aqueous solution.

Example 18

A solution of $PuO_2^{+2}$ in 1 M $HNO_3$–10 M $NH_4NO_3$ was agitated with an equal volume of nitroethane until the extraction equilibrium was attained. The phases were then separated and the extract was analyzed for plutonium content. The extraction was found to be approximately 61 percent complete.

Example 19

A solution of $PuO_2^{+2}$ in saturated aqueous lithium nitrate was agitated with 1.5 times its volume of 1-nitropropane until the extraction equilibrium was attained. The phases were then separated, and the extract was found to contain approximately 81 percent of the plutonium content of the original aqueous solution.

Example 20

A solution of $PuO_2^{+2}$ in 1 M $HNO_3$–10 M $NH_4NO_3$ was agitated with an equal volume of nitrobenzene. The phases were then separated and the extract was analyzed for plutonium content. The extraction was found to be approximately 28 percent complete.

It is to be understood, of course, that the above examples are merely illustrative and do not limit the scope of my invention. Other solvents of the class previously described may be substituted for the specific solvents of these examples, and the procedures employed may be modified in numerous respects within the scope of the foregoing description. In general it may be said that the use of any equivalents or modifications of procedure which would naturally occur to those skilled in the art is included in the scope of my invention. Only such limitations should be imposed on the scope of this invention as are indicated in the appended claims.

This is a division of copending application U.S. Serial No. 591,410, filed May 1, 1945, which is a continuation-in-part of copending application U.S. Serial No. 481,660, filed April 3, 1943, and patented on October 29, 1957, as U.S. Patent No. 2,811,415, and all subject matter therein not inconsistent with the subject matter herein is incorporated by reference.

What is claimed is:

1. A process for the separation of plutonium from an aqueous solution containing plutonium in an oxidation state of at least +4 which comprises contacting said solution with a solvent selected from the group consisting of nitromethane, nitroethane, 1-nitropropane, nitrobenzene and o-nitroanisole, and separating the resulting extract and raffinate phases.

2. A process for the separation of plutonium from an aqueous inorganic acid solution containing plutonium in an oxidation state of at least +4 and a common ion salting-out agent, which comprises contacting said solution with a solvent selected from the group consisting of nitromethane, nitroethane, 1-nitropropane, nitrobenzene and o-nitroanisole, and separating the resulting extract and raffinate phases.

3. A process for the separation of plutonium from an aqueous nitric acid solution containing tetravalent plutonium ions and a nitrate salting-out agent, which comprises contacting said solution with a solvent selected from the group consisting of nitromethane, nitroethane, 1-nitropropane, nitrobenzene and o-nitroanisole, and separating the resulting extract and raffinate phases.

4. The process of claim 3 in which the nitro compound is nitromethane.

5. The process of claim 3 in which the nitro compound is nitroethane.

6. The process of claim 3 in which the nitro compound is 1-nitropropane.

7. The process of claim 3 in which the nitro compound is nitrobenzene.

8. The process of claim 3 in which the nitro compound is o-nitroanisole.

9. A process for the separation of plutonium from an aqueous nitric acid solution containing hexavalent plutonium ions and a nitrate salting-out agent, which comprises contacting said solution with a solvent selected from the group consisting of nitromethane, nitroethane, 1-nitropropane, nitrobenzene and o-nitroanisole, and separating the resulting extract and raffinate phases.

10. The process of claim 9 in which the nitro compound is nitromethane.

11. The process of claim 9 in which the nitro compound is nitroethane.

12. The process of claim 9 in which the nitro compound is 1-nitropropane.

13. The process of claim 9 in which the nitro compound is nitrobenzene.

14. The process of claim 9 in which the nitro compound is o-nitroanisole.

References Cited in the file of this patent

UNITED STATES PATENTS 2,227,833      Hixson et al.  ----------- Oct. 12, 1945